United States Patent
Hoshi et al.

(10) Patent No.: US 10,048,665 B2
(45) Date of Patent: Aug. 14, 2018

(54) DEVICE CONTROLLER, DEVICE CONTROL METHOD, AND CONTROL SYSTEM

(71) Applicant: KYOCERA Corporation, Kyoto-shi, Kyoto (JP)

(72) Inventors: Daisuke Hoshi, Sakura (JP); Kazuaki Azuma, Yasu (JP)

(73) Assignee: KYOCERA Corporation, Kyoto (JP)

( * ) Notice: Subject to any disclaimer, the term of this patent is extended or adjusted under 35 U.S.C. 154(b) by 173 days.

(21) Appl. No.: 15/025,252

(22) PCT Filed: Sep. 26, 2014

(86) PCT No.: PCT/JP2014/004953
§ 371 (c)(1),
(2) Date: Mar. 25, 2016

(87) PCT Pub. No.: WO2015/045409
PCT Pub. Date: Apr. 2, 2015

(65) Prior Publication Data
US 2016/0239005 A1    Aug. 18, 2016

(30) Foreign Application Priority Data
Sep. 26, 2013 (JP) ................. 2013-200501

(51) Int. Cl.
*G05B 21/00* (2006.01)
*G01M 1/38* (2006.01)
(Continued)

(52) U.S. Cl.
CPC .......... *G05B 19/042* (2013.01); *G08C 17/02* (2013.01); *H04L 12/2816* (2013.01);
(Continued)

(58) Field of Classification Search
CPC .. G06F 3/0482; G06F 3/0488; G06F 3/04817; G06F 3/04842; G06F 3/04847;
(Continued)

(56) References Cited

U.S. PATENT DOCUMENTS 7,752,856 B2 * 7/2010 Senba .................... F24F 11/006
62/157
8,196,066 B1 * 6/2012 Ouyang .............. G06F 3/04883
715/708

(Continued)

FOREIGN PATENT DOCUMENTS

JP    2007-036394 A    2/2001
JP    2010-128810 A    6/2010
(Continued)

OTHER PUBLICATIONS

Extended European Search Report dated May 9, 2017, issued by the European Patent Office in counterpart European Patent Application No. 14 849764.7.
(Continued)

*Primary Examiner* — Thomas C Lee
*Assistant Examiner* — Zhipeng Wang
(74) *Attorney, Agent, or Firm* — Procopio Cory Hargreaves and Savitch LLP

(57) ABSTRACT

Even when a user wants to easily operate a plurality of load devices in his or her home using an information terminal device, dedicated application software needs to be started for each load device, which makes the operation complex. A device controller capable of controlling a plurality of load devices, includes: a controller; and a display unit having a first screen and a second screen, wherein the controller is configured to cause the display unit to display, in the first screen, a selection object that instructs a user to select at least one of the plurality of load devices and a first operation
(Continued)

object that instructs a user to perform a first type of operation relating to the plurality of load devices, and display, in the second screen, a second operation object including a second type of operation not included in the first operation object.

11 Claims, 7 Drawing Sheets

(51) Int. Cl.
| | | |
|---|---|---|
| *G05B 13/00* | (2006.01) | |
| *G05B 15/00* | (2006.01) | |
| *G05D 23/00* | (2006.01) | |
| *G05B 19/042* | (2006.01) | |
| *G08C 17/02* | (2006.01) | |
| *H04L 12/28* | (2006.01) | |
| *H04W 88/08* | (2009.01) | |

(52) U.S. Cl.
CPC ..... *H04W 88/08* (2013.01); *G05B 2219/2639* (2013.01); *G05B 2219/2642* (2013.01); *G08C 2201/30* (2013.01); *G08C 2201/51* (2013.01); *G08C 2201/93* (2013.01)

(58) Field of Classification Search
CPC . G06F 3/04883; G06F 3/04886; G08C 17/02; G08C 2201/42; G08C 2201/93; G08C 2201/30; G08C 2201/51; G05B 15/02; G05B 2219/2642; G05B 2219/25387; G05B 19/042; G05B 2219/2639; H04L 41/22; H04L 12/2803; H04L 12/02; H04L 12/2816; H04W 88/08
See application file for complete search history.

(56) References Cited

U.S. PATENT DOCUMENTS

| | | |
|---|---|---|
| 8,943,439 B2 | 1/2015 | Yoshioka |
| 9,134,972 B2 | 9/2015 | Kinoshita et al. |
| 2003/0061380 A1* | 3/2003 | Saito .................... H04L 12/2803 709/238 |
| 2008/0034081 A1* | 2/2008 | Marshall ................ G08C 17/02 709/223 |
| 2010/0005421 A1* | 1/2010 | Yoshioka ............ G06F 3/04817 715/835 |
| 2011/0035688 A1 | 2/2011 | Kinoshita et al. |
| 2012/0130513 A1* | 5/2012 | Hao ....................... G05B 15/02 700/90 |
| 2014/0040831 A1* | 2/2014 | Akasaka ............ G06F 3/04883 715/841 |
| 2015/0048924 A1* | 2/2015 | Feldstein ........... G07C 9/00103 340/5.51 |

FOREIGN PATENT DOCUMENTS

| | | |
|---|---|---|
| JP | 2012-168970 A | 6/2012 |
| WO | 2009/123030 A1 | 10/2009 |

OTHER PUBLICATIONS

Echonet Consortium, Part II, Echonet Lite Communication Middleware Specification, Version 1.00, Sep. 3, 2012, Retrieved from the internet: URL:http://www.echonet.gr.jp/english/spec/pdf_v100_lite_e/SpecLiteVer.1.0_e_02.pdf.

Maeda et al, Software Development for BS Digital Broadcast Receiver, Matsushita Technical Journal, Dec. 2000, pp. 85-92, vol. 46, No. 6.

International Search Report dated Dec. 22, 2014 issued by the Japanese Patent Office for International Application No. PCT/JP2014/004953.

Echonet Specification, May 31, 2013, Appendix pp. i-vi, Ch 1, 1-2, Ch. 2, 1-16, Ch. 3 1-338, and Annex I-III, Release C, Echonet Consortium.

* cited by examiner

DEVICE CONTROLLER, DEVICE CONTROL METHOD, AND CONTROL SYSTEM

CROSS REFERENCE TO RELATED APPLICATION

This application claims priority to Japanese Patent Application No. 2013-200501 filed on Sep. 26, 2013, the entire disclosure of which is incorporated herein by reference.

TECHNICAL FIELD

The disclosure relates to a controller, control method, and control system for home load devices using a network.

BACKGROUND

With the development of information technology, the technology of creating a home network in a home to manage and control a plurality of load devices collectively has been receiving attention in recent years. In particular, the growing awareness of energy issues has raised the need to install a power management device and keep track of the power consumption and the like of each device in the home as in a home energy management system (HEMS) (for example, Patent Literature (PTL) 1). There has been demand for technology of, in such a control system, managing and controlling the plurality of load devices in the home using an information terminal device such as a smartphone rapidly spreading among individuals.

CITATION LIST

Patent Literature

PTL 1: JP 2010-128810 A

SUMMARY

Technical Problem

The plurality of load devices in the home can be controlled by an information terminal device such as a smartphone according to application software specific to each load device, which is provided from the manufacturer of the load device. This, however, requires starting dedicated application software for each load device. There is thus a problem of complex operation given that the plurality of load devices are controlled.

Solution to Problem

To solve the stated problem, a device controller according to the disclosure is a device controller capable of controlling a plurality of load devices, the device controller including: a controller; and a display unit having a first screen and a second screen, wherein the controller is configured to cause the display unit to display, in the first screen, a selection object that instructs a user to select at least one of the plurality of load devices and a first operation object that instructs a user to perform a first type of operation relating to the plurality of load devices, and display, in the second screen, a second operation object including a second type of operation not included in the first operation object.

Desirably, the first type of operation is an operation performed by executing a mandatory command specified in association with a load device type in a predetermined communication protocol.

Desirably, the predetermined communication protocol is ECHONET Lite.

Desirably, the controller is configured to cause the first screen and the second screen to be displayed as separate screens by the same application software.

Desirably, the controller is configured to cause the first screen and the second screen to be displayed by application software different from each other.

Desirably, the controller is configured to cause the second screen to be displayed in the case where any of the plurality of load devices is selected through the selection object in the first screen.

Desirably, the controller is configured to cause the second screen corresponding to the load device selected in the first screen to be displayed.

Desirably, the controller is configured to start application software for displaying the second operation object, in the case where any of the plurality of load devices is selected through the selection object in the first screen.

Desirably, the controller is configured to start the application software corresponding to the load device selected in the first screen.

Desirably, the controller is configured to acquire information about a device status of each of the plurality of load devices, and cause the device status to be displayed in the first screen.

Desirably, the selection object is provided in a screen different depending on a type of the plurality of load devices.

To solve the stated problem, a control method according to the disclosure is a control method for a plurality of load devices, the control method including steps of: executing a first type of operation relating to the plurality of load devices in a predetermined screen; performing an instruction to select at least one of the plurality of load devices; and executing an operation including a second type of operation other than the first type of operation, in a screen different from the predetermined screen, wherein the first type of operation is an operation performed by executing a mandatory command specified in association with a load device type in a predetermined communication protocol.

To solve the stated problem, a control system according to the disclosure is a control system capable of controlling load devices, the control system including: a plurality of load devices; and a device controller configured to control the plurality of load devices, wherein the device controller includes: a controller; and a display unit having a first screen and a second screen, the controller is configured to cause the display unit to display, in the first screen, a selection object that instructs a user to select at least one of the plurality of load devices and a first operation object that instructs a user to perform a first type of operation relating to the plurality of load devices, and display, in the second screen, a second operation object including a second type of operation not included in the first operation object, and the first type of operation is an operation performed by executing a mandatory command specified in association with a load device type in a predetermined communication protocol.

Advantageous Effect

Since operation means mandatory for the plurality of load devices is provided in the same screen, a user interface with focused functions can be offered to the user, thus improving convenience. Moreover, both convenience and functionality can be achieved by providing non-mandatory operation in another screen.

DETAILED DESCRIPTION

The following describes one of the disclosed embodiments in detail with reference to drawings.

The term "mandatory command" used herein indicates a mandatory command specified in association with a load device type in a predetermined communication protocol. In this embodiment, ECHONET Lite is used as the communication protocol. Hence, the "mandatory command" in the following description indicates a command for accessing a "mandatory" property in each class requirement corresponding to load devices in detailed requirements for ECHONET device objects, e.g. "Release C". In particular, the "mandatory command for air conditioners" in the description indicates a command for accessing a "mandatory" property (whether mandatory or not is specified for each of setting (Set) and acquisition (Get)) in the requirements for home air conditioner class in the aforementioned requirements. The "first type of operation" in the disclosure is an operation by a "mandatory command" in this embodiment.

Embodiment 1

Figure 1:
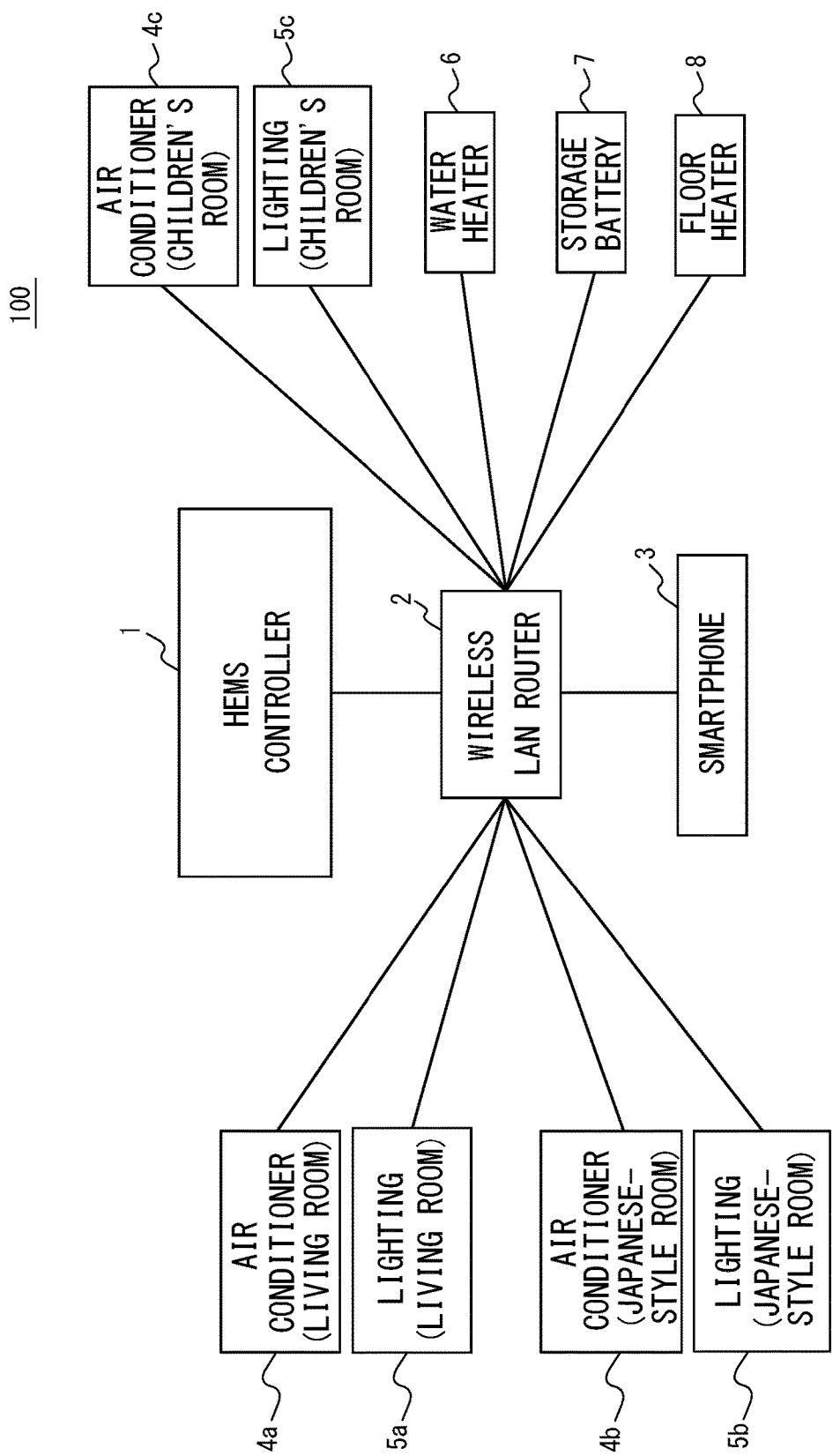
FIG. 1 is a block diagram illustrating the overall structure of a control system according to one of the disclosed embodiments.

FIG. 1 is a block diagram illustrating the overall structure of a control system 100 including a device controller (a smartphone 3) according to the disclosure. The control system 100 includes: a HEMS controller 1 for controlling the whole system; a wireless LAN router 2 for connecting all devices in the system by Wi-Fi (wireless fidelity); the smartphone 3 as the device controller for operating load devices and displaying their device statuses; and various load devices 4a to 4c, 5a to 5c, and 6 to 8.

The HEMS controller 1 is network-connected wirelessly (Wi-Fi) between the device controller (the smartphone 3) and the load devices 4a to 4c, 5a to 5c, and 6 to 8. The protocol used for communication with each device is ECHONET® (ECHONET is a registered trademark in Japan, other countries, or both) Lite approved as a HEMS standard protocol in Japan. The HEMS controller 1 transmits a command to each load device, changes the device status, and acquires information about the current device status from each load device, based on operation from the smartphone 3. The HEMS controller 1 is also connected to a current sensor connected to a distribution board, and acquires power consumption information in the home. The HEMS controller 1 further acquires power consumption information of home electric appliances and the like from outlet adapters such as smart taps via the network. Since Wi-Fi is used as communication means in this embodiment, the communication is performed via the wireless LAN router 2.

The smartphone 3 communicates with each of the load devices 4a to 4c, 5a to 5c, and 6 to 8 directly or via the HEMS controller 1, and transmits a command for changing the device operation status and the like. The smartphone 3 also acquires information about the current device status from each device. The communication is performed via the wireless LAN router 2.

The smartphone 3 is installed with HEMS application software on the assumption that the HEMS controller 1 is used, in order to offer a convenient user interface to the user. By starting the software, the user can access device selection means and device operation means displayed on the screen of the HEMS application software. The screen structure of the software will be described in detail later.

The smartphone 3 is also installed with device application software provided from each device manufacturer or the like to operate the corresponding load device. The user may normally download these software from the homepages of the device manufacturers or the like. The use of these software enables the execution of non-mandatory commands other than mandatory commands specified in ECHONET Lite.

The following describes the load devices. The load devices 4a to 4c are air conditioners installed in a living room, a Japanese-style room, and a children's room, respectively. Each of the load devices 4a to 4c includes a wireless LAN module or is equipped with an external wireless LAN adapter. The load devices 4a to 4c are capable of communicating with the HEMS controller 1 and the smartphone 3 via the wireless LAN router 2. The load devices 4a to 4c may each receive and process an operation status ON/OFF setting/acquisition command, an operation mode setting/acquisition command, and a set temperature value setting/acquisition command, as mandatory commands specified in ECHONET Lite. These mandatory commands may be operated not only on the corresponding device application software but also on the HEMS application software as described later.

The load devices 5a to 5c are lightings installed in the living room, the Japanese-style room, and the children's room, respectively. Each of the load devices 5a to 5c includes a wireless LAN module or is equipped with an external wireless LAN adapter. The load devices 5a to 5c are capable of communicating with the HEMS controller 1 and the smartphone 3 via the wireless LAN router 2. The load devices 5a to 5c may each receive and process an operation status ON/OFF setting/acquisition command and a lighting mode setting/acquisition command, as mandatory commands specified in ECHONET Lite. These mandatory commands may be operated not only on the corresponding device application software but also on the HEMS application software. The same applies to the below-mentioned water heater, storage battery, and floor heater.

The load device 6 is a water heater. The load device 6 includes a wireless LAN module or is equipped with an external wireless LAN adapter. The load device 6 is capable of communicating with the HEMS controller 1 and the smartphone 3 via the wireless LAN router 2. The load device 6 may receive and process an operation status ON/OFF acquisition command, a water heater heating status acquisition command, and a bath water heater heating status acquisition command, as mandatory commands specified in ECHONET Lite.

The load device 7 is a storage battery. The load device 7 includes a wireless LAN module or is equipped with an external wireless LAN adapter. The load device 7 is capable of communicating with the HEMS controller 1 and the smartphone 3 via the wireless LAN router 2. The load device 7 may receive and process an operation status ON/OFF acquisition command, an operation mode setting/acquisition command, a remaining battery capacity acquisition command, and a battery type acquisition command, as mandatory commands specified in ECHONET Lite. Although the storage battery used in this embodiment is a lithium ion battery, other types of storage batteries such as a nickel-metal-hydride battery may be used.

The load device 8 is a floor heater. The load device 8 includes a wireless LAN module or is equipped with an external wireless LAN adapter. The load device 8 is capable of communicating with the HEMS controller 1 and the smartphone 3 via the wireless LAN router 2. The load device 8 may receive and process an operation status ON/OFF setting/acquisition command and a set temperature value setting/acquisition command, as mandatory commands specified in ECHONET Lite.

Figure 2:
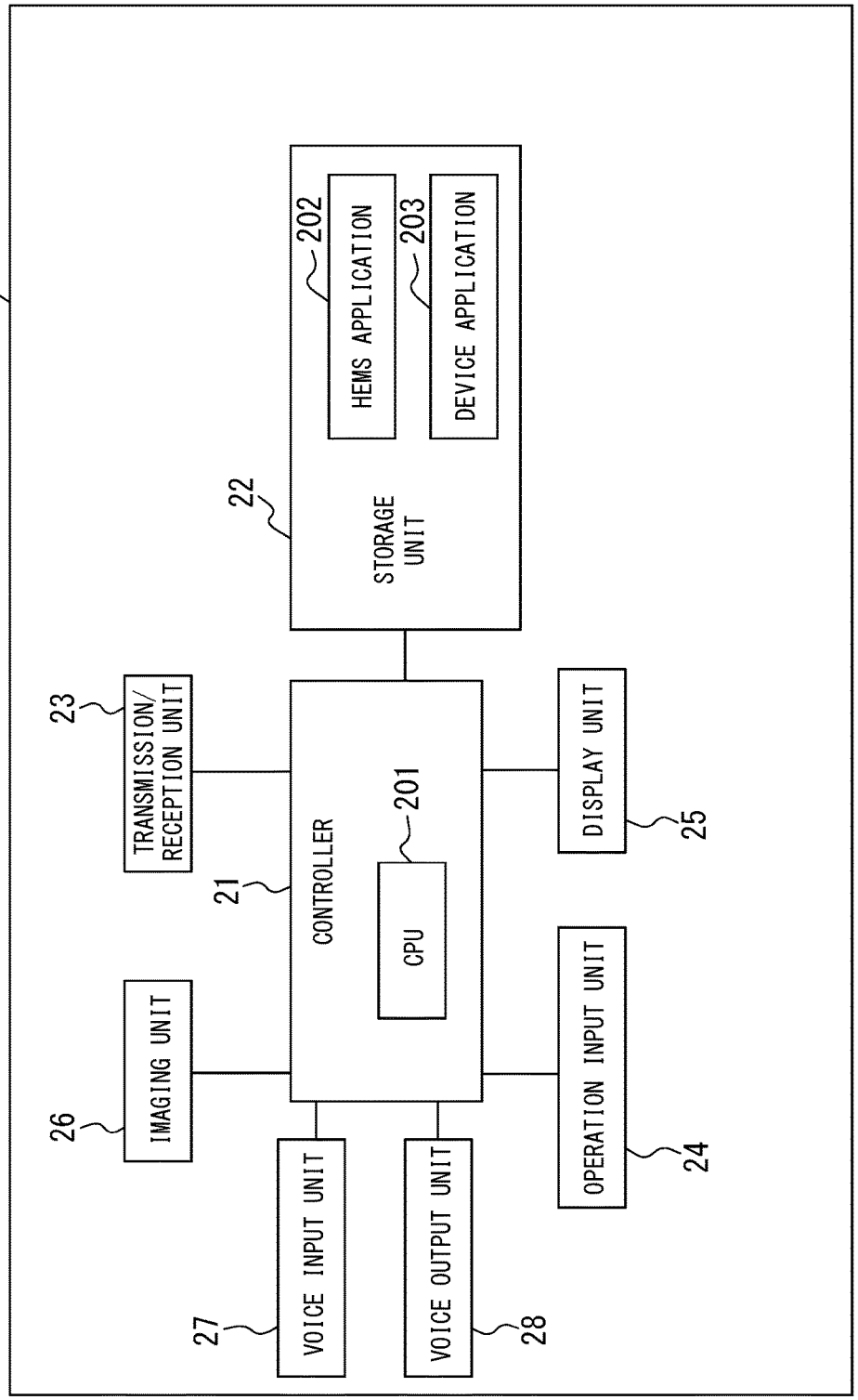
FIG. 2 is a block diagram illustrating the structure of a device controller according to one of the disclosed embodiments.

The following describes the hardware structure of the device controller (the smartphone 3). In FIG. 2, the smartphone 3 includes: a controller 21 for performing various device controls; a storage unit 22 for storing various data; a transmission/reception unit 23 for transmitting and receiving radio waves; an operation input unit 24 for performing input operations on devices; a display unit 25 for displaying screens; an imaging unit 26 including a camera; and a voice input unit 27 and voice output unit 28 for inputting and outputting telephone voice.

The controller 21 includes a central processing unit (CPU) 201, and performs various controls including the execution of application software and encoding/decoding processes. The storage unit 22 is used to store and read various data including the below-mentioned HEMS application software 202 (hereafter "HEMS application 202") and device application software 203 (hereafter "device application 203").

Figure 3:
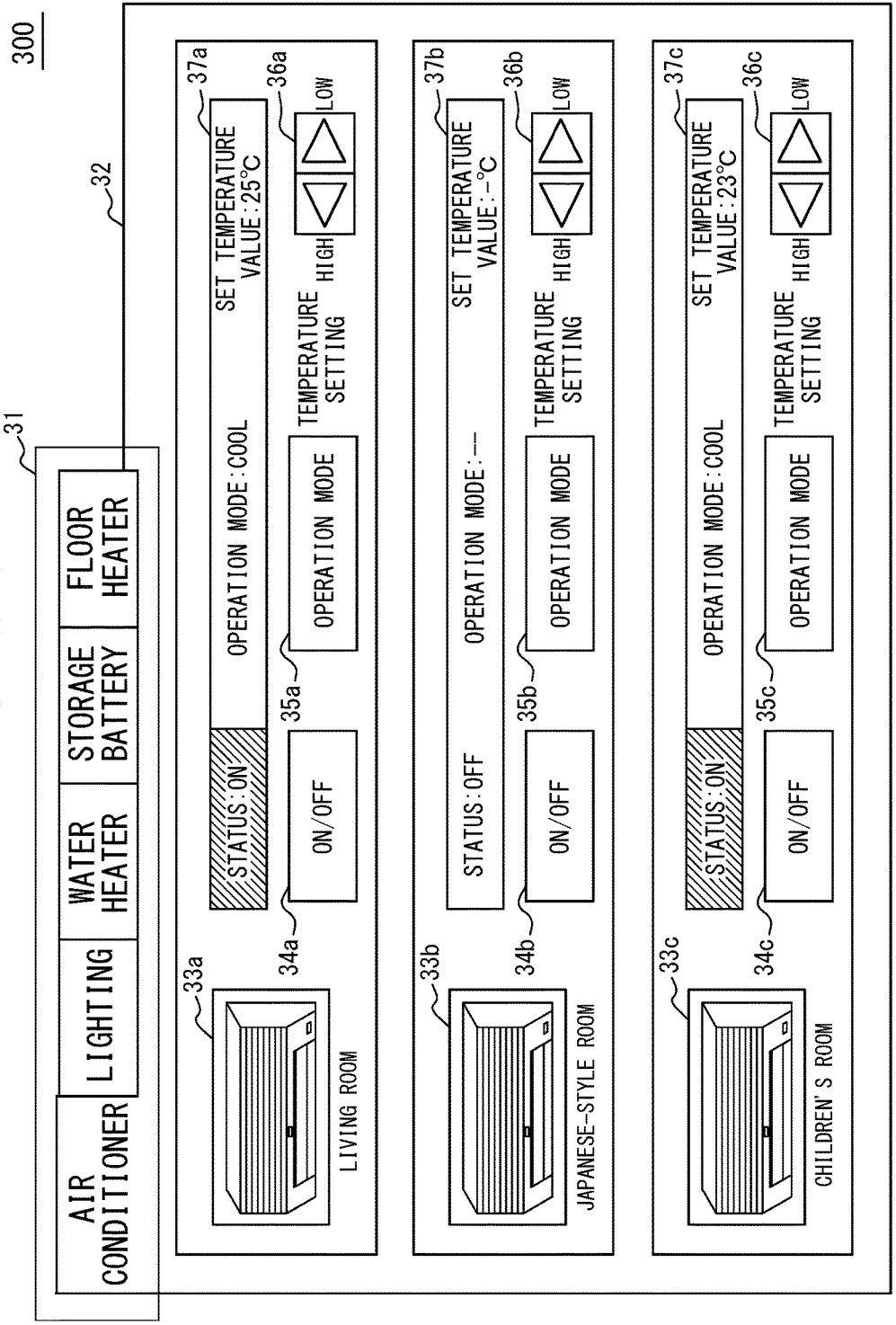
FIG. 3 is a diagram illustrating a main screen including load device selection means and first operation means in the device controller according to one of the disclosed embodiments.

Application software installed in the device controller (the smartphone 3) is described in detail below. FIG. 3 is a diagram illustrating the structure of a main screen 300 displayed first when starting the HEMS application 202 in the smartphone 3. The term "button" in the following description indicates a "button object" displayed in a screen according to an instruction from the controller.

The main screen 300 includes: an index portion 31 for classified display according to the load device type; and a device display portion 32 for displaying selectable devices belonging to the device type selected in the index portion 31. The device display portion 32 has device selection buttons 33a to 33c for selecting the load devices, device operation buttons 34a to 34c, 35a to 35c, and 36a to 36c for operating the load devices, and device status display portions 37a to 37c for displaying the statuses of the load devices. FIG. 3 illustrates a display screen when the device type "air conditioner" is selected in the index portion 31. In this embodiment, when the HEMS application 202 is started, the device type selected at the previous start is displayed first.

The device selection buttons 33a to 33c are provided to individually select the respective load devices belonging to the device type selected in the index portion 31. The respective device operation buttons have "living room", "Japanese-style room", and "children's room" displayed directly underneath. When the HEMS application 202 first recognizes a load device, the manufacturer name and product name recognized from the manufacturer code and product code acquired from the load device are displayed in this area. After this, the user may change the display to the name corresponding to the installation location of the device, as illustrated in FIG. 3.

The device operation buttons 34a to 34c, 35a to 35c, and 36a to 36c and the device status display portions 37a to 37c are buttons and display portions for setting (Set) and acquisition (Get) of operation status ON/OFF, operation mode setting, and set temperature value for air conditioners. These commands are specified as mandatory commands for air conditioners in ECHONET Lite. Only the buttons corresponding to the commands specified as mandatory commands for home air conditioner class in ECHONET Lite are arranged in the device display portion 32 in the main screen 300. In the case where the user selects "lighting" in the index portion, buttons for operation status ON/OFF and lighting mode setting specified as mandatory commands for general lighting class are arranged. The same applies in the case of selecting "water heater", "storage battery", or floor heater" in the index portion.

When the user wants to turn on the air conditioner in the Japanese-style room, the user presses the device operation button 34b. As a result, the air conditioner in the Japanese-style room starts operation, and the leftmost display in the device status display portion 37b on the screen is changed to "status: ON". Here, "dry" which is the operation mode when the air conditioner was turned on the last time continues to be used, and "operation mode: dry" and "set temperature value: –° C." are displayed in the device status display portion 37b. When the user wants to change the operation mode, the user presses the device operation button 35b. As a result, the operation mode displayed at the center of the device status display portion 37b is switched in the order of dry→fan→auto→heat→dry.

In this example, the device operation buttons for the plurality of air conditioners are operably displayed. In the case where device operation buttons for a large number of air conditioners are displayed, the possibility of an operational error increases. For example, there is a possibility that, instead of the device operation button (e.g. 34b) of the air conditioner which the user wants to operate, the user wrongly operates the device operation button (e.g. 34c) of another air conditioner. Accordingly, in the case where the user selects the device selection button 33b or any of the device operation buttons 34b to 36b of the air conditioner, the device operation buttons of the devices other than this air conditioner may be disabled so as to prohibit operation, in the first stage. The controller may then wait for the user to select any of the device operation buttons 34b to 36b, and execute the operation corresponding to the selected button, in the second stage. For example, disabling a button involves a process of, when the button is selected, nullifying the selection. Moreover, the disabled operation button is preferably displayed darker so that the user can visually recognize the disabled state of the button. Further, a cancel button for canceling the disabled state may be newly displayed in the disabled state. Alternatively, the first stage may be canceled in the case where the user selects any of the disabled operation buttons.

Thus, when the user presses any of the device operation buttons, the mandatory command corresponding to the pressed button is transmitted to and set (Set) in the corresponding load device. Moreover, the HEMS application 202 regularly acquires (Get) the device status of the load device and displays the result in the device status display portion 37*b* and the like, as described later.

Figure 4:
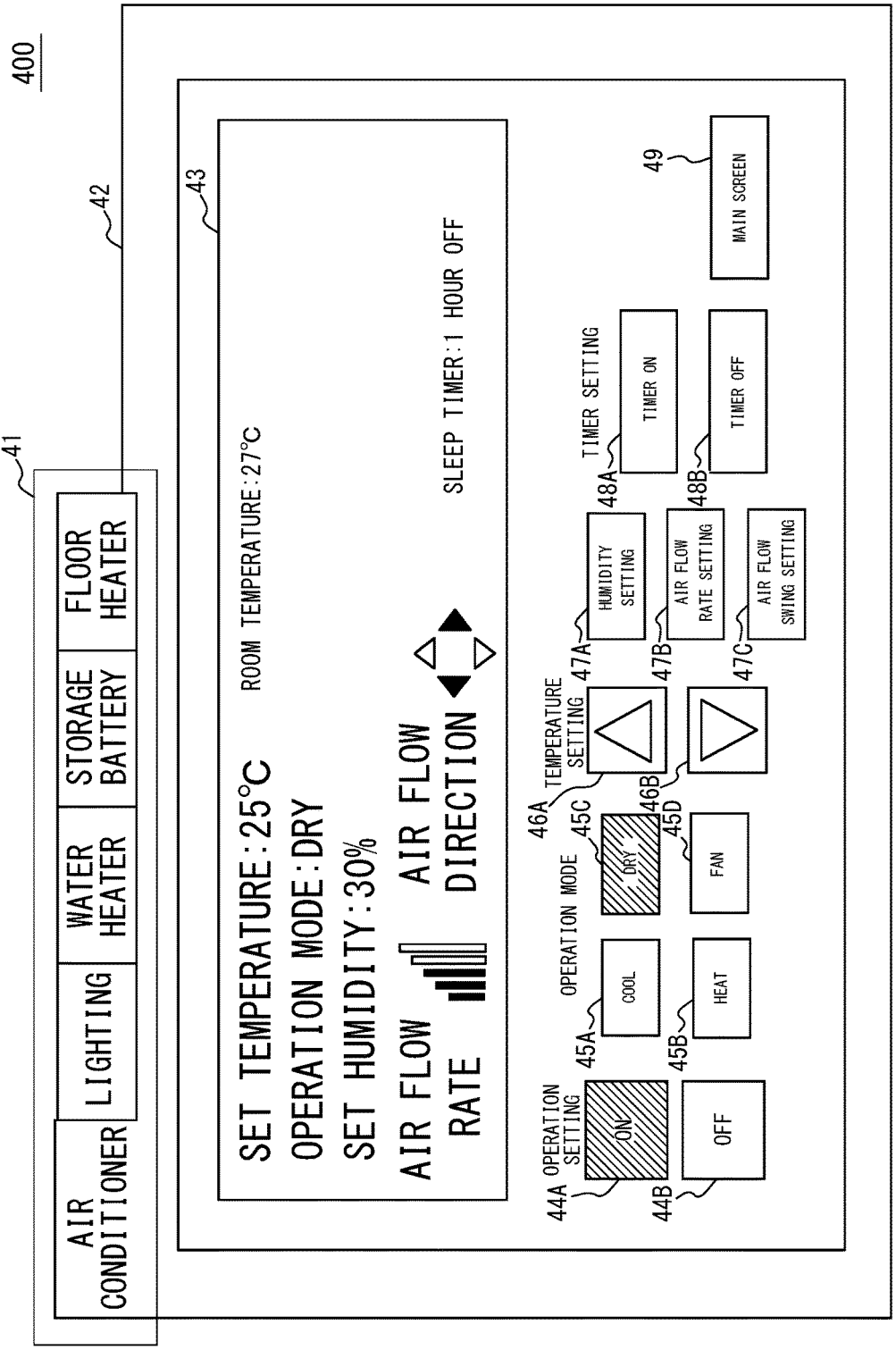
FIG. 4 is a diagram illustrating a device details screen including second operation means displayed when a load device is selected according to Embodiment 1.

Next, suppose the user wants to perform air flow swing setting for the load device 4*b* (the air conditioner in the Japanese-style room). Since air flow swing setting is not a mandatory command specified in ECHONET Lite, the corresponding operation button is not displayed in the device display portion 32. The user accordingly presses the device selection button 33*b*, to display another screen. When the user presses the device selection button 33*b*, a device details screen 400 in the same application software is displayed on the screen of the smartphone 3, as illustrated in FIG. 4. The device details screen 400 has buttons 44A, 44B, 45A to 45D, 46A, and 46B corresponding to the mandatory commands of the selected device type (air conditioner). The device details screen 400 also has buttons 47A to 47C, 48A, and 48B corresponding to the non-mandatory commands of the air conditioner. Each time the user presses the device operation button 47C for air flow swing setting in the device details display portion 42, the air flow direction display (black mark direction) in the device status display portion 43 changes in the order of OFF→up and down→right and left→up and down and right and left.

When the user wants to end the operation of the air conditioner in the Japanese-style room, the user presses the device operation button 44B for turning off the air conditioner in the device details display portion 42. As a result, the air conditioner in the Japanese-style room is turned off, and the device status display in the device details display portion 42 is cleared. By pressing a main screen button 49, the user can return to the main screen 300 for displaying the device display portion 32.

The operation when the user uses the HEMS application 202 has been described above. The following describes the detailed operation of each device corresponding to the user operation.

Figure 5:
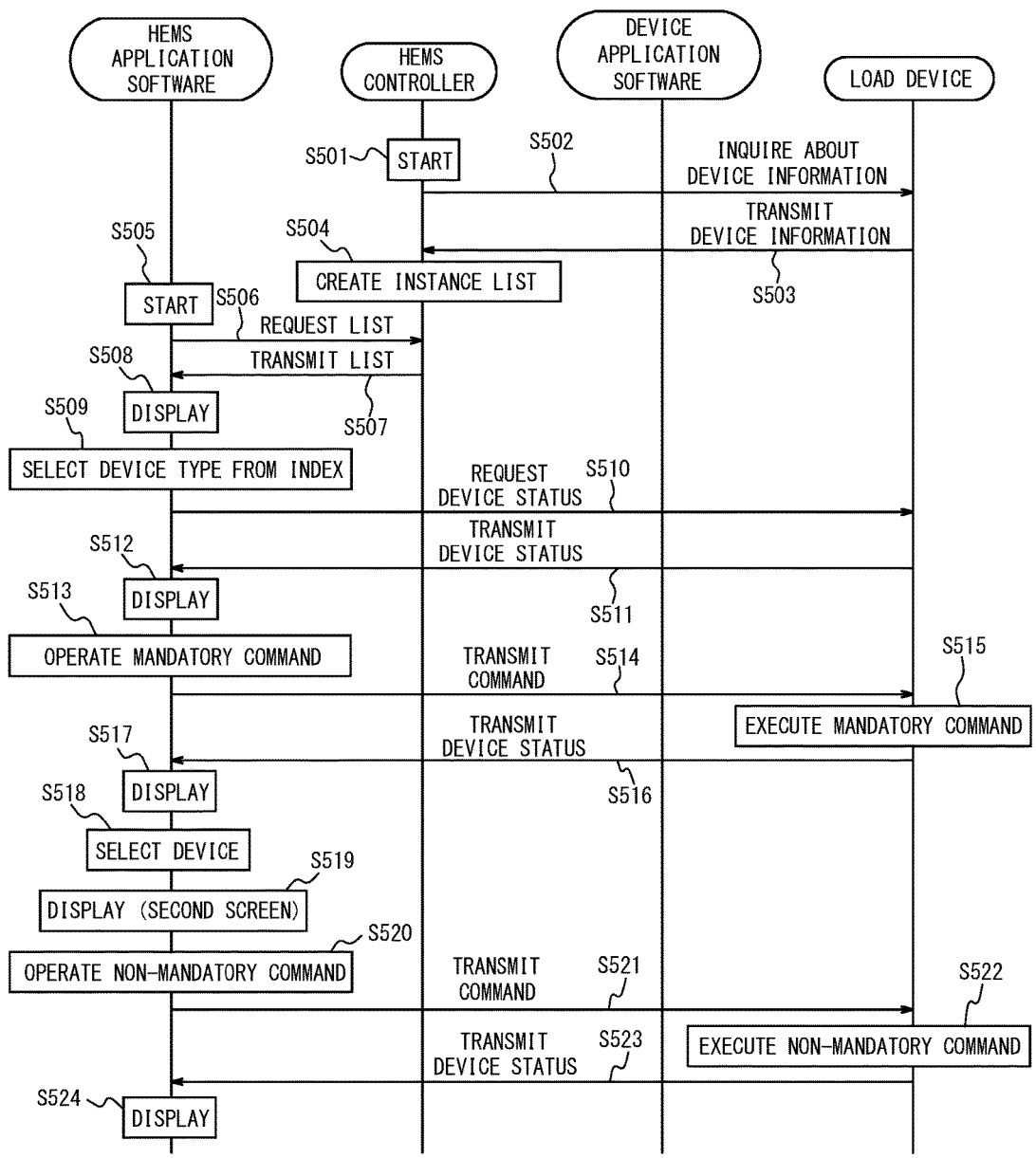
FIG. 5 is a diagram illustrating the operation procedure of the control system according to Embodiment 1.

FIG. 5 is a flowchart illustrating the operation of each device when the user executes mandatory and non-mandatory commands in ECHONET Lite using the HEMS application 202 in Embodiment 1.

The HEMS controller 1 is typically energized all day. In FIG. 5, when the HEMS controller 1 is first started (step S501), the HEMS controller 1 inquires of each of the network-connected load devices 4*a* to 4*c*, 5*a* to 5*c*, and 6 to 8 about device information (step S502). Each load device on the network transmits various device information including the manufacturer code, product code, mandatory/non-mandatory commands supported by the device, and latest device status, to the HEMS controller 1 (step S503). The HEMS controller 1 creates an instance list associating each load device and its device information, based on the information obtained from each load device (step S504). After the start, the HEMS controller 1 continues to collect various information from each load device and update the instance list, on a regular basis such as every 1 minute.

When the user starts the HEMS application 202 in the smartphone 3 (step S505), the HEMS application 202 first requests the instance list in the HEMS controller 1 (step S506). In response to the request from the smartphone 3, the HEMS controller 1 transmits part or the whole of the instance list managed in the HEMS controller 1 to the smartphone 3 (step S507). The instance list information transmitted to the smartphone 3 includes the manufacturer information of each load device, the supported mandatory/non-mandatory command list of each load device, and the latest device status of each load device.

The HEMS application 202 displays information on its software screen, based on the device status information of each load device acquired from the HEMS controller 1 (step S508). For example, the HEMS application 202 displays the operation status, the operation mode, and the set temperature value in each of the device status display portions 37*a* to 37*c* in the device display portion 32 in FIG. 3, based on the device status of the corresponding air conditioner. Suppose the user selects the tab of another device type (e.g. lighting) in the index portion 31 (step S509). The HEMS application 202 requests information about the current device status of each lighting, in addition to the information about the mandatory/non-mandatory commands for each lighting obtained in steps S506 and S507 (step S510). Having received the device status from each lighting via the HEMS controller 1 (step S511), the HEMS application 202 promptly displays the result in the device display portion 32 (step S512).

Suppose the user selects the air conditioner tab in the index portion 31 again, and performs the operation of turning on the air conditioner in the Japanese-style room (the load device 4*b*). The command for turning on or off the load device 4*b* is a mandatory command as mentioned above, and the corresponding device operation button 34*b* is included in the device display portion 32 displayed when the device type "air conditioner" is selected. When the user presses the device operation button 34*b* (step S513), the HEMS application 202 transmits the corresponding command to the load device 4*b* (step S514). The load device 4*b* executes the command (operation ON) received from the HEMS application 202 in step S514 (step S515), and transmits the device status after the execution to the HEMS application 202 via the HEMS controller 1 (step S516). Having received the device status "operation ON" from the load device 4*b*, the HEMS application 202 changes the leftmost display in the device status display portion 37*b* to "status: ON" (step S517). In step S516, the HEMS application 202 receives the device status about the operation mode and the set temperature value, in addition to "operation ON". The HEMS application 202 accordingly changes the operation mode display and the set temperature value display respectively to "operation mode: dry" and "set temperature value: –° C.", along with changing the operation status display.

The user then presses the device selection button 33*b*, to perform air flow swing setting for the load device 4*b* (step S518). As a result, the device details screen 400 for detailed operation in the same HEMS application 202 is displayed as illustrated in FIG. 4 (step S519). The user presses the device operation button 47C a predetermined number of times, to perform air flow swing setting which is a non-mandatory command (step S520). The HEMS application 202 transmits the corresponding command to the load device 4*b* (step S521). The load device 4*b* executes the command (air flow swing setting: right and left) received from the HEMS application 202 in step S521 (step S522), and transmits the device status after the execution to the HEMS application 202 via the HEMS controller 1 (step S523). Having received the device status "air flow swing setting: right and left" from the load device 4*b*, the HEMS application 202 changes the air flow direction display (black mark direction) in the device status display portion 43 to "right and left" (step S524).

Although the screen for displaying mandatory commands in the HEMS application 202 has index display with the devices being classified by device type, this is not a limitation. The display form may be customized as appropriate, such as the user classifying and index-displaying the devices on a room-by-room basis.

Although this embodiment describes the case where the HEMS application 202 acquires the manufacturer information of each load device, the mandatory/non-mandatory commands supported by each device, etc. from the instance list in the HEMS controller 1 and acquires the latest device status of each load device from the load device via the HEMS controller 1, this is not a limitation. The HEMS application 202 may directly acquire all of the aforementioned information from each load device, or all of the aforementioned information from the instance list in the HEMS controller 1.

Although this embodiment describes the case where the control system 100 network-connects all devices in the system by Wi-Fi (wireless fidelity), this is not a limitation. For example, the control system 100 may network-connects the devices by another standard communication protocol defining the physical layer, such as Ethernet® (Ethernet is a registered trademark in Japan, other countries, or both) or power line communication (PLC).

Although this embodiment describes the case where, when communicating with each device, the control system 100 uses ECHONET Lite as a communication protocol in combination with Wi-Fi, this is not a limitation. For example, the control system 100 may perform the communication using another standard communication protocol defining only the upper layers while providing a degree of freedom to the physical layer, such as the Smart Energy Profile 2.0 (SEP 2.0) of ZigBee® (ZigBee is a registered trademark in Japan, other countries, or both), in combination with Wi-Fi or the like.

Although this embodiment describes the case where the device controller is the smartphone 3, this is not a limitation. The device controller may be any of various devices such as a personal computer, a tablet personal computer (PC), and a network-connectable television.

Although this embodiment describes the case where the smartphone 3 is connected to the HEMS controller 1 and each load device by Wi-Fi, this is not a limitation. The HEMS controller 1 may be connected to the Internet, with the smartphone 3 outside the home and equally connected to the Internet controlling each load device via the HEMS controller 1.

Although this embodiment describes the case where only the operation buttons of the mandatory commands of ECHONET Lite are provided in the main screen 300 of the HEMS application 202, this is not a limitation. In addition to all mandatory commands, one or more non-mandatory command buttons used frequently by the user may be displayed in the main screen 300.

Embodiment 2

The following describes Embodiment 2. Embodiment 2 differs from Embodiment 1 only in the operation after the device selection button is pressed in the HEMS application 202. Hence, the following describes only the operation after the device selection button is pressed. The following description refers to FIGS. 1 and 3 as the overall structure of the control system 100 in FIG. 1 and the structure of the main screen 300 of the HEMS application 202 in FIG. 3 in Embodiment 1 also apply to Embodiment 2, and also refers to FIGS. 6 and 7 instead of FIGS. 4 and 5.

Figure 6:
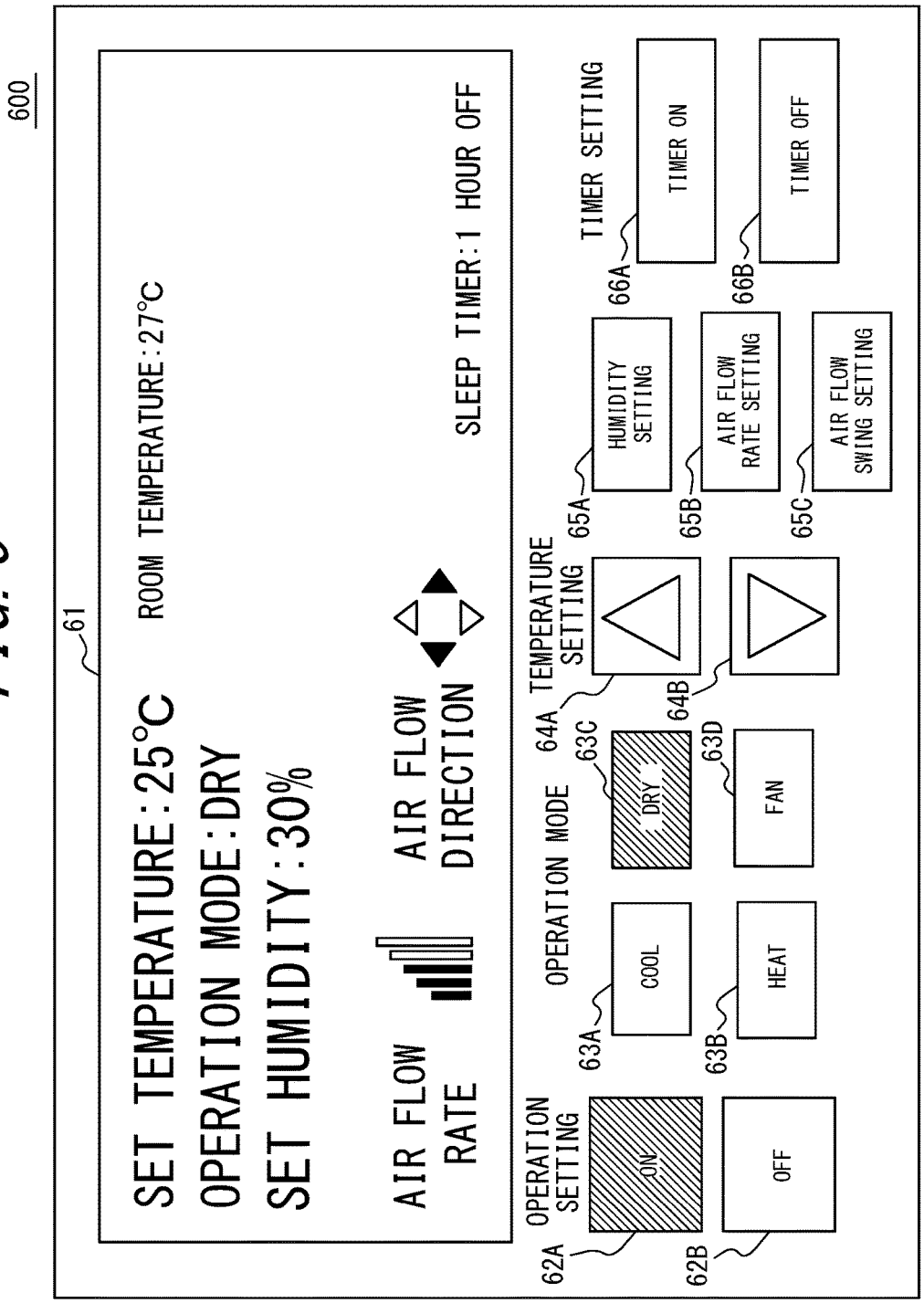
FIG. 6 is a diagram illustrating a device details screen including second operation means displayed when a load device is selected according to Embodiment 2.
Figure 7:
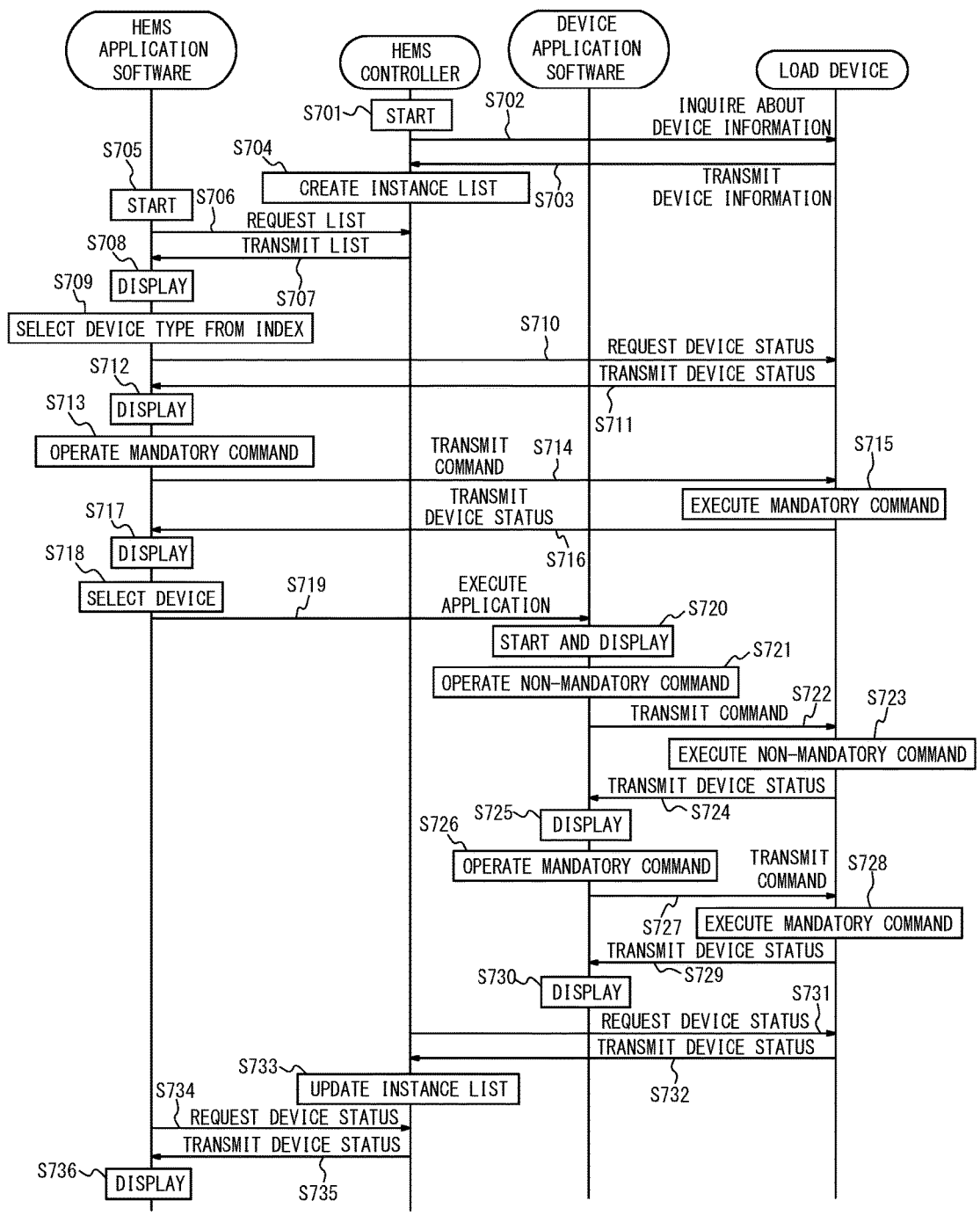
FIG. 7 is a diagram illustrating the operation procedure of the control system according to Embodiment 2.

The operation after the user presses the device selection button 33b corresponding to the load device 4b to perform air flow swing setting for the load device 4b in FIG. 3 is described below. FIG. 6 is a diagram illustrating a device details screen 600 in the device application 203, and FIG. 7 is a flowchart illustrating the operation in Embodiment 2. When the user presses the device selection button 33b (step S718), the smartphone 3 executes the device application 203 corresponding to the load device 4b which has been installed beforehand (step S719). As a result of starting the software, the device details screen 600 in the device application 203 illustrated in FIG. 6 is displayed on the smartphone 3 (step S720). The user presses a device operation button 65C for air flow swing setting a predetermined number of times (step S721). The device application 203 transmits the corresponding command to the load device 4b (step S722). The load device 4b executes the command (air flow swing setting: right and left) received from the device application 203 in step S722 (step S723), and transmits the device status after the execution to the device application 203 (step S724). Having received the device status "air flow swing setting: right and left" from the load device 4b, the device application 203 changes the air flow direction display (black mark direction) in the device status display portion 61 to "right and left" (step S725).

When the user wants to end the operation of the air conditioner in the Japanese-style room, the user presses a device operation button 62B for turning off the air conditioner in the device details screen 600 (step S726). The smartphone 3 transmits the corresponding command from the device application 203 to the load device 4b (step S727). The load device 4b executes the command (operation OFF) received from the device application 203 in step S727 (step S728), and transmits the device status after the execution to the smartphone 3 (step S729). Having received the device status "operation OFF" from the load device 4b, the device application 203 in the smartphone 3 clears the display in the device status display portion 61 (step S730).

As a result of the operation of steps S724, S725, S729, and S730, the screen in the device application 203 executing the command can reflect the device status of the load device 4b as the operation result. Meanwhile, the HEMS application 202 not involved in the operation cannot recognize that the operation has been performed, and so cannot display the latest device status of the load device 4b. A mechanism for solving this problem is described below.

The HEMS controller 1, after started, continues to request each load device to notify its device status on a regular basis such as every 1 minute, as mentioned earlier (step S731). The HEMS controller 1 continues to update the instance list (step S733), based on the device status information from each load device (step S732).

The HEMS application 202 in the smartphone 3 requests the HEMS controller 1 to notify the device status of each load device on a regular basis such as every 5 minutes (step S734). Having received the device status information from the HEMS controller 1 (step S735), the HEMS application 202 updates the device information in the device display portion 32 in the HEMS application 202 to the latest status (step S736).

As described above, according to the disclosed embodiments, operation means mandatory for a plurality of load devices in a home is provided in the same screen. In this way, an easy-to-understand user interface with focused functions can be offered to the user, thus improving convenience. Moreover, both convenience and functionality can be achieved by providing non-mandatory operation in another screen.

According to the disclosed embodiments, mandatory operation means is set as a mandatory command specified in association with a load device type in a predetermined communication protocol, i.e. ECHONET Lite. A general-purpose and easy-to-view user interface not dependent on the application software producer's preference can thus be offered.

According to Embodiment 1, mandatory operation means and non-mandatory operation means are provided in separate screens of the same application software. This allows the user to perform non-mandatory operation promptly and easily, with no need to start other application software.

According to Embodiment 2, when performing non-mandatory operation, device-specific application software is started cooperatively. This reduces the burden on the software producer, and allows the user to perform non-mandatory operation easily.

According to the disclosed embodiments, a device selection button for displaying non-mandatory operation means is included in the same screen as mandatory operation means. This eases access from the mandatory operation means to the non-mandatory operation means.

According to Embodiment 2, the display in the HEMS application 202 reflects a change in device status by operation performed in the device application 203. This enables centralized management of the plurality of load devices in the HEMS application 202, while ensuring functionality.

According to the disclosed embodiments, operation means for different device types can be selectively displayed through the index portion. A user interface easily viewable by the user can thus be offered.

Although the disclosed device, method, and system have been described by way of the drawings and embodiments, various changes or modifications may be easily made by those of ordinary skill in the art based on the disclosure. Such various changes or modifications are therefore included in the scope of the disclosure. For example, the functions included in the members, means, steps, etc. may be rearranged without logical inconsistency, and a plurality of means, steps, etc. may be combined into one means, step, etc. and a means, step, etc. may be divided into a plurality of means, steps, etc.

Many of the disclosed aspects are described in terms of sequences of operations performed by a computer system or other hardware capable of executing program instructions. Examples of the computer system or other hardware include a general-purpose computer, personal computer (PC), dedicated computer, workstation, personal communications system (PCS), cellular phone, cellular phone capable of data processing, RFID receiver, game machine, electronic notepad, laptop computer, global positioning system (GPS) receiver, and other programmable data processors. Note that, in each embodiment, various operations are executed by dedicated circuitry (e.g. discrete logical gates interconnected to realize specific functions) implemented by program instructions (software) or logical blocks, program modules, or the like executed by at least one processor. Examples of at least one processor executing logical blocks, program modules, or the like include at least one microprocessor, central processing unit (CPU), application specific integrated circuit (ASIC), digital signal processor (DSP), programmable logic device (PLD), field programmable gate array (FPGA), processor, controller, microcontroller, microprocessor, electronic device, other devices designed to execute the functions described herein, and/or any combination thereof. The embodiments described herein are implemented, for example, by hardware, software, firmware, middleware, microcode, or any combination thereof. Instructions may be program code or code segments for performing necessary tasks, and may be stored in a non-transitory machine-readable storage medium or other medium. A code segment may represent a procedure, a function, a subprogram, a program, a routine, a subroutine, a module, a software package, a class, or any combination of instructions, data structures, or program statements. A code segment is connected to another code segment or a hardware circuit, by performing transmission and/or reception of information, data arguments, variables, or storage contents with the other code segment or hardware circuit.

Examples of the network used herein include, unless otherwise specified, the Internet, ad hoc network, local area network (LAN), wide area network (WAN), metropolitan area network (MAN), cellular network, wireless wide area network (WWAN), wireless personal area network (WPAN), public switched telephone network (PSTN), terrestrial wireless network, other networks, or any combination thereof. The components of the wireless network include, for example, an access point (e.g. Wi-Fi access point) and a femtocell. The wireless communicator may be connected to a wireless network using Wi-Fi, Bluetooth® (Bluetooth is a registered trademark in Japan, other countries, or both), cellular communication technology (e.g. Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA)), or any other wireless technology and/or technological standard. The network may employ one or more technologies. Examples of such technologies include Universal Mobile Telecommunications System (UTMS), Long Term Evolution (LTE), Evolution-Data Optimized or Evolution-Data Only (EV-DO), Global System for Mobile communications (GSM® (GSM is a registered trademark in Japan, other countries, or both)), Worldwide Interoperability for Microwave Access (WiMAX), Code Division Multiple Access-2000 (CDMA-2000), and Time Division Synchronous Code Division Multiple Access (TD-SCDMA).

The circuit structure of a communicator or the like provides functionality by using any of various wireless communication networks such as WWAN, WLAN, and WPAN. The WWAN may be a CDMA network, a TDMA network, a FDMA network, an OFDMA network, a SC-FDMA network, or the like. The CDMA network may implement one or more radio access technologies (RATs) such as CDMA2000, wideband-CDMA (W-CDMA), and so on. CDMA2000 includes IS-95, IS-2000, and IS-856 standards. The TDMA network may implement GSM®, Digital Advanced Phone System (D-AMPS), or other RAT. GSM® and W-CDMA are described in documents from a consortium named 3rd Generation Partnership Project (3GPP). CDMA2000 is described in documents from a consortium named 3rd Generation Partnership Project 2 (3GPP2). The WLAN may be an IEEE 802.11x network. The WPAN may be a Bluetooth® network, an IEEE 802.15x network, or other type of network. CDMA may be implemented as a wireless technology such as Universal Terrestrial Radio Access (UTRA) or CDMA2000. TDMA may be implemented as a wireless technology such as GSM®/General Packet Radio Service (GPRS)/Enhanced Data Rates for GSM® Evolution (EDGE). OFDMA may be implemented as a wireless technology such as Institute of Electrical and Electronics Engineers (IEEE) 802.11 (Wi-Fi), IEEE 802.16 (WiMAX), IEEE 802.20, or Evolved UTRA (E-UTRA). Such technologies may be used for any combination of WWAN, WLAN, and/or WPAN. Such technologies may also be implemented to use an ultra mobile broadband (UMB) network, a high rate packet data (HRPD) network, a CDMA20001X network, GSM®, Long-Term Evolution (LTE), etc.

The storage used herein may be in any tangible form of computer-readable carrier (medium) in the categories of solid-state memory, magnetic disk, and optical disk. Such a medium stores an appropriate set of computer instructions, such as program modules, and data structures for causing a processor to carry out the techniques disclosed herein. Examples of the computer-readable medium include an electrical connection having one or more wires, magnetic disk storage medium, magnetic cassette, magnetic tape, other magnetic and optical storage devices (e.g. compact disk (CD), LaserDisc® (LaserDisc is a registered trademark in Japan, other countries, or both), digital versatile disc (DVD® (DVD is a registered trademark in Japan, other countries, or both)), Floppy® (floppy is a registered trademark in Japan, other countries, or both)) disk, Blu-ray Disc® (Blu-ray Disc is a registered trademark in Japan, other countries, or both)), portable computer disk, random access memory (RAM), read-only memory (ROM), EPROM, EEPROM, flash memory, other rewritable and programmable ROM, other tangible storage medium capable of storage, and any combination thereof. Memory may be provided inside and/or outside a processor/processing unit. The term "memory" used herein indicates any type of memory such as long-term storage, short-term storage, volatile, nonvolatile, and other memory, and the number of memory media or the types of media are not limited.

It should be noted that the system is disclosed herein as having various modules and/or units for executing specific functions. These modules and units are schematically illustrated to simplify the description of its functionality, and do not necessarily represent specific hardware and/or software. In this regard, the modules, units, and other components may be hardware and/or software implemented to substantially execute the specific functions described herein. Various functions of different components may be any combination or separate ones of hardware and/or software, and may be used separately or in combination. Input/output (I/O) devices or user interfaces including, but not limited to, a keyboard, a display, a touchscreen, and a pointing device may be connected to the system directly or via intervening I/O controllers. Thus, the disclosed various aspects may be embodied in many different forms, and all such embodiments are within the scope of the disclosure.

REFERENCE SIGNS LIST

1 HEMS controller
2 wireless LAN router
3 smartphone
4a to 4c load device (air conditioner)
5a to 5c load device (lighting)
6 load device (water heater)
7 load device (storage battery)
8 load device (floor heater)
21 controller
22 storage unit
23 transmission/reception unit
24 operation input unit
25 display unit
26 imaging unit
27 voice input unit
28 voice output unit
31 index portion
32 device display portion
33a to 33c device selection button
34a to 34c device operation button
35a to 35c device operation button
36a to 36c device operation button
37a to 37c device status display portion
41 index portion
42 device details display portion
43 device status display portion
44A to 44B device operation button
45A to 45D device operation button
46A to 46B device operation button
47A to 47C device operation button
48A to 48B device operation button
49 main screen button
61 device status display portion
62A to 62B device operation button
63A to 63D device operation button
64A to 64B device operation button
65A to 65C device operation button
66A to 66B device operation button
100 control system
201 CPU
202 HEMS application software
203 device application software
300 main screen
400 device details screen
600 device details screen

The invention claimed is:

1. A device controller capable of controlling a plurality of load devices, the device controller comprising:

a controller; and a display unit having a first screen and a second screen, wherein the controller is configured to cause the display unit to display, in the first screen, a selection object that instructs a user to select at least one of the plurality of load devices and a first operation object that instructs a user to perform a first type of operation relating to the plurality of load devices, and display, in the second screen, a second operation object not displayed in the first screen and including a second type of operation not included in the first operation object, and wherein the first type of operation is an operation performed by executing a mandatory command for a partial functionality specified in association with a load device type in a predetermined communication protocol corresponding to the plurality of load devices, the second type of operation is an operation performed by executing a non-mandatory command specified for a load device in the plurality of load devices, the controller is configured to cause the first screen to be displayed by a first application and to cause the second screen to be displayed by a second application different from the first application, the first application transmits the mandatory command to the load device, and the second application transmits the mandatory command and the non-mandatory command to the load device.

2. The device controller according to claim 1, wherein the predetermined communication protocol is ECHONET Lite.

3. The device controller according to claim 1, wherein the controller is configured to cause the first screen and the second screen to be displayed as separate screens by the same application software.

4. The device controller according to claim 3, wherein the controller is configured to cause the second screen to be displayed in the case where any of the plurality of load devices is selected through the selection object in the first screen.

5. The device controller according to claim 4, wherein the controller is configured to cause the second screen corresponding to the load device selected in the first screen to be displayed.

6. The device controller according to claim 1, wherein the controller is configured to start the second application for displaying the second operation object, in the case where any of the plurality of load devices is selected through the selection object in the first screen.

7. The device controller according to claim 6, wherein the controller is configured to start the second application corresponding to the load device selected in the first screen.

8. The device controller according to claim 1, wherein the controller is configured to acquire information about a device status of each of the plurality of load devices, and cause the device status to be displayed in the first screen.

9. The device controller according to claim 1, wherein the selection object is provided in a screen different depending on a type of the plurality of load devices.

10. A control method for a plurality of load devices, the control method comprising:
  executing a first application to display, in a first screen, a selection object that instructs a user to select one or more of the plurality of load devices and a first operation object that instructs a user to perform a first type of operation relating to the plurality of load devices, wherein the first type of operation is an operation performed by executing a mandatory command for a partial functionality specified in association with a load device type in a predetermined communication protocol corresponding to the plurality of load devices;
  in response to performance of the first type of operation for at least one of the plurality of load devices, executing the first application to transmit the mandatory command to the at least one load device;
  receiving an instruction to select at least one of the plurality of load devices;
  in response to the instruction, executing a second application that is different from the first application to display, in a second screen, a second operation object not displayed in the first screen and including a second type of operation not included in the first operation object, wherein the second type of operation is an operation performed by executing a non-mandatory command specified for the selected at least one load device; and,
  in response to performance of the second type of operation for the selected at least one load device, executing the second application to transmit the non-mandatory command to the load device.

11. A control system capable of controlling load devices, the control system comprising:
  a plurality of load devices; and
  a device controller configured to control the plurality of load devices, wherein the device controller comprises:
    a controller; and
    a display unit having a first screen and a second screen,
    wherein the controller is configured to cause the display unit to display, in the first screen, a selection object that instructs a user to select at least one of the plurality of load devices and a first operation object that instructs a user to perform a first type of operation relating to the plurality of load devices, and display, in the second screen, a second operation object not displayed in the first screen and including a second type of operation not included in the first operation object, and
    wherein
      the first type of operation is an operation performed by executing a mandatory command for a partial functionality specified in association with a load device type in a predetermined communication protocol corresponding to the plurality of load devices,
      the second type of operation is an operation performed by executing a non-mandatory command specified for a load device in the plurality of load devices,
      the controller is configured to cause the first screen to be displayed by a first application and to cause the second screen to be displayed by a second application different from the first application,
      the first application transmits the mandatory command to the load device, and
      the second application transmits the mandatory command and the non-mandatory command to the load device.

* * * * *